Nov. 7, 1939.   J. A. SCHROEDER ET AL   2,179,432
UNIVERSAL COUPLER
Filed Dec. 14, 1936   3 Sheets-Sheet 1
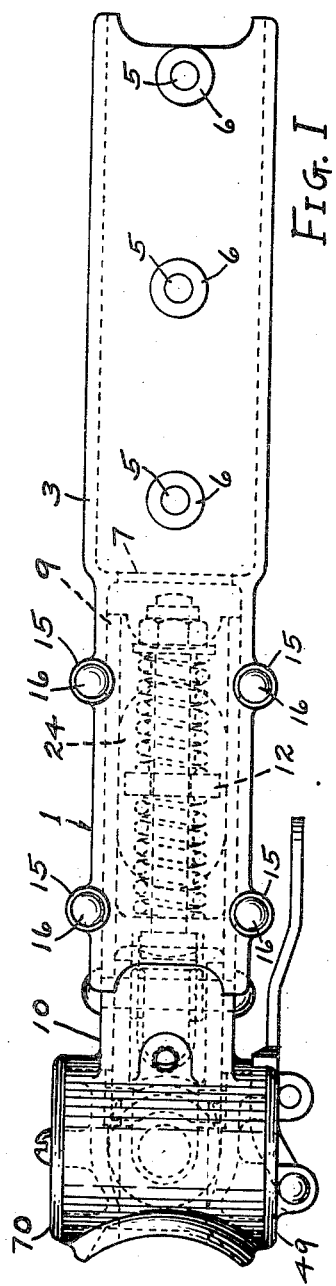
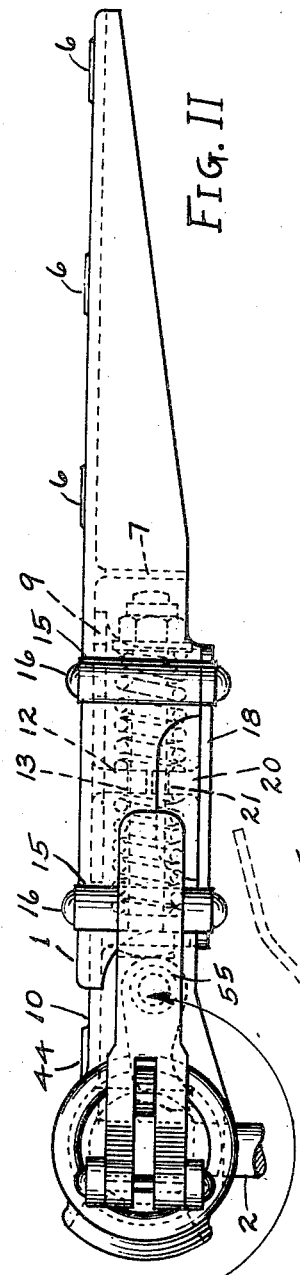
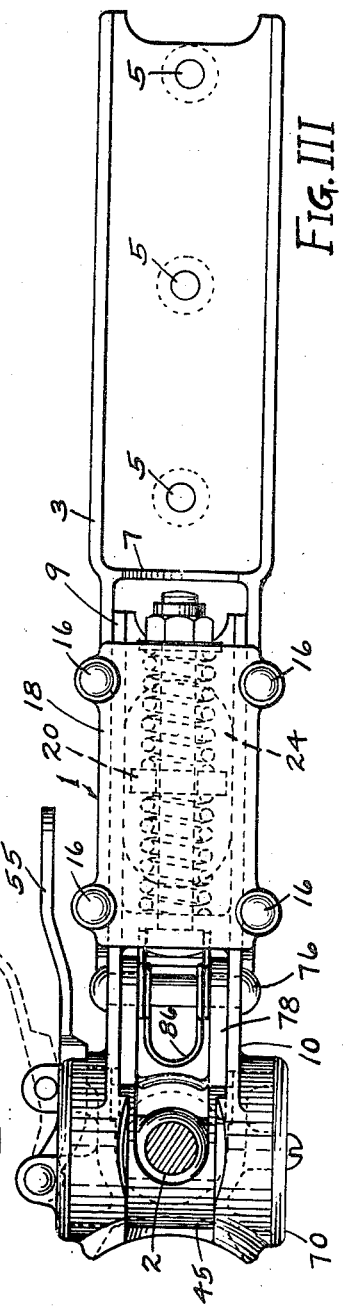
INVENTORS Nov. 7, 1939.  J. A. SCHROEDER ET AL  2,179,432
UNIVERSAL COUPLER
Filed Dec. 14, 1936  3 Sheets-Sheet 2
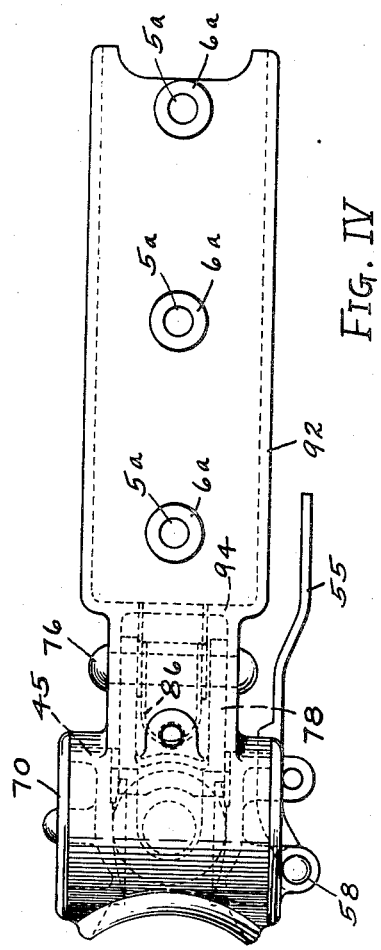
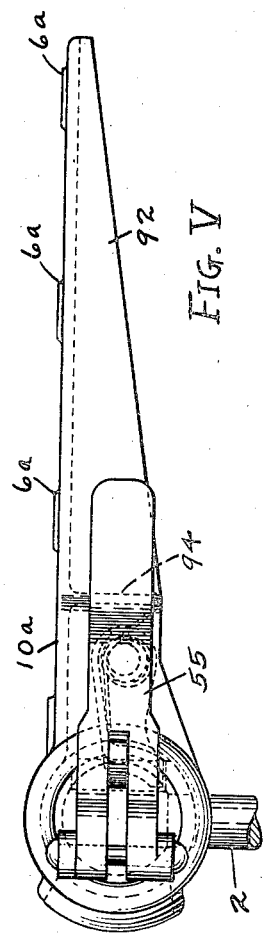

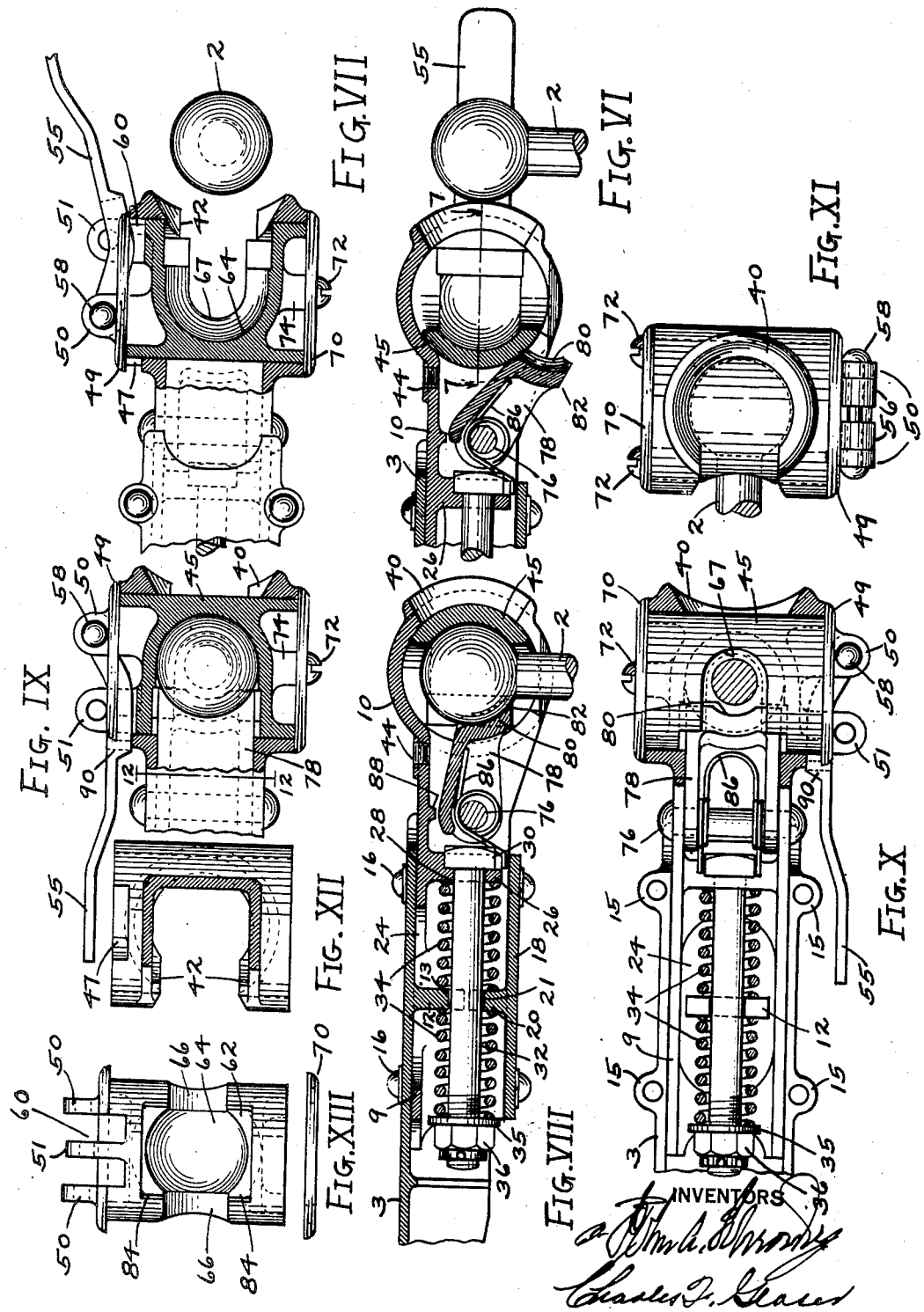

Patented Nov. 7, 1939

2,179,432

UNITED STATES PATENT OFFICE 2,179,432

UNIVERSAL COUPLER

John A. Schroeder, Dearborn, and Charles F. Glaser, Detroit, Mich.

Application December 14, 1936, Serial No. 115,684

7 Claims. (Cl. 280—33.15)

The invention relates to universal couplers in general and in particular to devices commonly called trailer hitches for coupling a trailing vehicle to a power or tractor vehicle, and is of the ball and socket type.

Prior devices of this nature have certain disadvantages, which make their practical use undesirable; for example, some of the prior devices require that the female, ball-receiving member must be raised in order to receive the male, ball-stud member through its underside; others are provided with side openings for receiving the ball-stud member. It is obvious that when the male and female members are each secured to vehicles of substantial weight, serious difficulties may be encountered in maneuvering the members into the correct relationship in order that the vehicles may be joined.

Therefore, it is one of the principal objects of this invention to provide a universal coupler wherein no relative lateral or vertical movement is required of the male and female members during the process of coupling.

A further disadvantage of prior devices is that ordinarily an excessive number of operations are necessary in order to insert the ball-stud member into its complemental opening and insure its retention in said opening. The positiveness of the securing means is exceedingly important. In some prior devices, springs or springing means are relied upon for this important function.

Therefore, another of the principal objects of this invention is to provide a universal coupler comprising a mechanism whereby the ball-stud member may be inserted and retained in the female member with the exercise of only one manual operation.

More specifically, the above object is to provide a trailer hitch whereby the ball-stud member may be secured within the female-receiving member by manually swinging a pivoted lever through approximately 180 degrees.

A further principal object is to provide a universal coupler comprising a mechanism whereby the male and female members of said coupler are positively secured to prevent their coming apart.

More specifically, the above object is to provide a cylindrical female member having an internal spherical surface for complementally receiving the male member and an opening on one side thereof which, when in the locked position, permits the entry of a locking member which automatically prevents the male member from being disengaged.

A further object is to provide a universal coupler wherein an adjusting or wear-compensating means is inherent in the securing means.

A further object is to provide a universal coupler wherein the locking member is also the wear-compensating means.

A further object is to provide a universal coupler wherein shocks are resiliently cushioned, thereby reducing wear.

A further object is to provide in a universal coupler a shock-load cushioning means comprising two springs, balanced one against the other, thereby cushioning shocks from two directions.

A further disadvantage of prior devices is the lack of provision for lubrication. Due to the severe operating conditions of devices of this nature, it is apparent that unless the wearing surfaces are lubricated, flat spots and looseness will occur which will seriously hamper the efficiency and operation.

Therefore, a further object is to provide a universal coupler wherein an amount of lubricant is carried for constant lubrication of the contacting parts.

In prior devices where lubricant has been provided for, the design is very complicated. In other words, the provision for lubricant was special and in addition to the designing required for the coupler.

Therefore, a further object is to provide a universal coupler wherein lubricant is carried in a reservoir or pocket that is inherent in the design of said coupler.

A further object is to provide a universal coupler that is inexpensive and simple to manufacture; that is strong and durable and that is simple in operation.

The foregoing and other objects will be apparent from the following description of the drawings wherein—

Figure 1 is a top plan view of a universal coupler comprising the preferred form of the invention, Figure 2 is a side elevational view of Figure 1, Figure 3 is a view looking from the underside of Figure 2, Figure 4 is a top plan view similar to Figure 1, excepting that a modified form of the invention is disclosed, Figure 5 is a side elevational view of Figure 4, Figure 6 is a partial view, sectioned on a vertical longitudinal plane, showing the relation of the parts prior to the insertion of the male ball stud, Figure 7 is a partial top plan view in partial section along the line 7—7 of Figure 6, Figure 8 is a view similar to Figure 6, excepting that the ball-stud member is secured within the female member, Figure 9 is a view similar to Figure 7 with the exception that the ball-stud member is secured within the female member, Figure 10 is a view in partial section, looking upwardly at Figure 8 with the lower cover plate removed, Figure 11 is an end elevational view of Figure 10, Figure 12 is a sectional view in detail of the body member, looking in the direction of the arrows and taken on the line 12—12 of Figure 9, and Figure 13 is a detailed view of the cylindrical ball-receiving member and its side cover.

Referring now to the drawings wherein like reference characters refer to like parts wherever they occur and with particular reference to Figures 1, 2 and 3, the invention consists principally in a female member assembly, generally designated by the numeral 1 and a male ball-stud member 2.

The female member assembly 1 comprises a tongue adapter member 3, one end of which (as shown) is of a tapering inverted U section. It is understood that the size and shape of said section will depend upon the size of the tongue of the vehicle to which it is to be attached. In the present invention it is adapted to fit a tongue of square or rectangular section. Apertures 5, reinforced by bosses 6, are provided in longitudinal alinement for the insertion of bolts or other suitable securing means by which manner the female member assembly is secured to said vehicle tongue. The other end of the tongue adapter member 3 is also of inverted U section, but of slightly smaller size, laterally.

At the point of section change is an internal wall 7, having a circular internal shape. Said wall 7 has two functions: (1) it reinforces the juncture of the two different size sections and (2) it provides a stop for the tail portion 9 of housing 10. At a point approximately midway of the length of the reduced section end of member 3 is a downwardly depending lug 12 which terminates at approximately the horizontal centerline of the coupler and has on its lower surface a semi-circular recess 13, the purpose of which will be described later.

On the sides of the reduced portion of member 3 are four bosses 15—two on each side—which are suitably apertured to take rivets or bolts 16. Said rivets 16 extend through similar apertures in ears provided therefor in lower cover plate 18 and thereby removably secure said cover plate to member 3.

Said cover plate is essentially flat, having the ears and holes before-mentioned. In addition, said cover plate has an upstanding lug 20 designed to register with downwardly depending lug 12 and has on its upper surface a semi-circular recess 21, which is supplementary to the similar recess 13 of lug 12.

In the above manner a rectangular opening is formed between the top and sides of member 3 and cover plate 18. Slidably fitting inside of said rectangular opening is the tail portion 9 of housing 10 which is also of substantially inverted U section and has on its upper surface an ovate opening 24 for the purpose of clearing lug 12 and permitting relative longitudinal movement with respect thereto.

At a point adjacent the inner edge of said opening 24 of tail portion 9 is a depending lateral wall 26 (see Figure 8) which is apertured as at 28, to register with the opening formed by semi-circular recesses 13 and 21. Said wall 26 is also recessed on its inner side as at 30, said recess is central about aperture 28 and is formed to the contour of the head of a bolt 32 in order to prevent said bolt from turning. In the present invention, the head of the bolt is shown as being square.

Placed around bolt 32 are two identical coil springs 34—one being confined between wall 26 and lugs 12 and 20 and the other being confined between lugs 12 and 20 and a washer 35 which is suitably positioned on bolt 32 by means of nut 36.

It is evident from the above description that tail portion 9 of housing 10 will be positioned with respect to tongue adapter member 3 by means of springs 34 and that shock loads imparted to member 3 will be cushioned by means of one of said springs and shock loads imparted to housing 10 will be cushioned by means of the other of said springs. It is also evident that varying shock loads may be compensated for by varying the size of the springs and by varying the initial loading thereon by means of nut 36.

The U section of tail portion 9 blends into a substantially laterally extending cylindrical section at the forward end of housing 10. On the forward side of said cylindrical section is a lipped circular opening 40 which may best be seen in Figure 11. The diameter of this opening is slightly greater than the diameter of the ball of ball-stud member 2 and has a lipped effect therearound to more easily guide said ball member therein. Said circular opening 40 has a slot 42 on the underside thereof which extends longitudinally and blends into the open portion of the U section. It is through this slot 42 that the shank of ball-stud member 2 passes. The cylindrical portion is bored laterally and centrally of its outer diameter to receive cylindrical ball-receiving member 45.

Located centrally, on top, and immediately to the rear of the point where the cylindrical portion joins the upper portion of the U section is a small boss 44. Said boss has an aperture therein which is suitably threaded to permit the insertion of a lubricant fitting when lubrication is needed and a small pipe plug at all other times. Said cylindrical portion of housing 10 also has a slot 47 on one side thereof adjacent the tail portion and on the longitudinal centerline for a purpose to be later described.

Cylindrical ball-receiving member 45 is adapted to be rotatably secured within the cylindrical portion of housing 10. It has a length equal to the width of said cylindrical portion and has on one end thereof a flange or abutting portion 49, which is adapted to register with the side of the cylindrical portion of housing 10 which has notch 47 therein. Extending outwardly from abutting portion 49 are bosses or ears 50 and 51. The ears 50 are arranged in vertical alinement and to one side of said abutting portion and are centrally apertured lineally so that a lever 55 having spaced bosses 56 at one end thereof may be pivotally held between said ears 50 by means of a through rivet 58, or other suitable means. Ear 51 is centrally apertured parallel to the linear apertures in ears 50, and is spaced on the opposite side of abutting portion 49 so that ear 51 would form the apex of a triangle of which ears 50 would be the remaining two corners. Adjacent each side of ear 51 are longitudinal recesses 60 which are adapted to register with slot 47 in the cylindrical portion of housing 10 when the device is in a locked position.

It is understood that any sort of operating lever 55 may be used. In the present invention it is conventional in form, carrying the split construction of ears 56 to a point sufficiently far to insure straddling ear 51. From this point to the free end it is preferably of one piece. On the outward side of the double portion of said lever and in the vicinity of lug 51 are depending lugs 90. Said lugs are provided to register with slots 60 and 47 when said slots are themselves in register. The distance across the lever at the lugs is just slightly less than the width of slots 47 and 60. This prevents excessive lost motion or looseness.

On one side of the cylindrical surface of member 45 is a rectangular opening 62 which extends laterally inward almost to the longitudinal centerline of said member. Member 45 also has centrally of its interior a spherical surface 64 which is opposite to said rectangular opening 62. Substantially, at right angles to said rectangular opening and in the lateral plane thereof are two identical openings 66 in the form of slots with semi-circular endings 67. Said openings 66 connect the upper and lower sides of rectangular opening 62 with spherical surface 64. This design then permits ball-stud member 2 to be inserted through said rectangular opening with its shank portion extending downwardly through the lower of slots 66. Spherical surface 64 is substantially the same diameter as the diameter of the ball of ball-stud member 2.

A cover 70 similar to portion 49 of member 45 is provided on the opposite side of said cylindrical portion and clamps the cylindrical ball-receiving member 45 within said cylindrical portion of housing 10 by means of screws 72 which are inserted through openings in said cover and threadedly engaged in bosses 74 provided therefor in member 45.

The sides of the U section of housing 10 are laterally apertured just forward of the lateral wall 26 for the purpose of inserting a rivet 76 therethrough and thus pivotally secure locking and adjusting member 78 in place. Said member 78 is substantially of U section, having apertures on its sides at one end to fit around rivet 76 and closed at its opposite end with a spherical surface 80 complemental to spherical surface 64 of member 45. When the mechanism is in locked position and member 78 is in place, said spherical surface 80 extends from a point slightly above the longitudinal centerline to a point just above the neck of the ball-stud member 2. The lower surface 82 adjacent the spherical portion 80 is adapted, when in locked position, to register with ledges 84 of rectangular opening 62 of member 45. The width of member 78 is equal to—or slightly less than—the length of said rectangular opening 62; in other words, in locked position, the spherical portion 80 of member 78 fits into the rectangular opening 62 of member 45 and forms a complemental spherical bearing surface for the ball of ball-stud member 2 with spherical surface 64. In this manner then the ball portion of male member 2 is substantially entirely encased within and has complete bearing with the female receiving members.

Side motion of member 78 is prevented by the confining region of rectangular portion 62 and spreading of the spherical surface, or as seen in Figure 8, downward motion of ball-stud member 2 is prevented by means of surface 82 of member 78 registering with shoulders or ledges 84 of member 45.

Wear on the spherical surfaces is compensated for by means of spring 86 which exerts pressure upwardly against locking member 78. Said spring is fulcrumed about rivet 76 intermediate the sides of the U section of member 78 and has one end anchored under the lateral wall 26 of tail portion 9 and the other end bears upwardly against the underside of the U section of said member. In this manner then constant pressure is brought to bear upon the ball-stud member 2, thereby automatically adjusting for any wear.

On the underside of the upper wall of housing 10 and immediately over the apertures for rivet 76 in the side walls is a depending lateral rib 88 which extends downwardly to a point almost touching the upper surface of member 78. Thus an enclosed space or pocket is formed between rib 88, side and upper walls of housing 10 and portions of ball member 2 and cylindrical member 45. Lubricant admitted to this space will be in direct contact with the wearing surfaces of the ball and socket and will be prevented from escaping by reason of the close proximity of rib 88 to the upper surface of member 78.

The operation of the device is very simple. As shown in Figures 6 and 7, cylindrical ball-receiving member 45 is rotated in the cylindrical portion of housing 10 so that spherical portion 64 is toward the rear and rectangular opening 62 is toward the front. Ball-stud member 2 is then inserted longitudinally—and it is noted that no lifting or side motion is required—and cylindrical member 45 is rotated by means of lever 55 in a clockwise direction until the slots 60 in member 45 is in register with the slot 47 of housing 10. When these slots are in register, cylindrical member 45 will be rotated to the position shown in Figures 8, 9 and 10.

It will be noted in Figure 6 that in the open position, cylindrical member 45 has been rotated in a counter-clockwise direction and that the central wall portion thereof has pressed member 78 downwardly so that it no longer can perform its duties. When cylindrical member 45 is rotated in a clockwise direction, as soon as the lower edge of the central wall thereof passes the upper portion of spherical surface 80 of member 78, the spring 86 will cause said member 78 to travel upwardly—pivoting about rivet 76—and thus come into register with the rectangular opening 62 of cylindrical member 45. At the same time the wall in back of the spherical surface 64 is passing around the spherical ball-stud member 2 and is securing it in position. Cylindrical portion 45 is then locked in position relative to housing member 10 by inserting the lug portions 90 of lever 55 into the registering slots 60 and 47. Said lever 55 is then prevented from coming out of said slots by inserting through the aperture in ear 51 a retaining bolt, pin or other means.

The ball stud is released from the female assembly member 1 in the reverse manner merely by removing the retaining pin or bolt from ear 51, pulling the lug portions of lever 55 out of register with the slots and rotating said lever 180 degrees.

The modification shown in Figures 4 and 5 are identical in operation with that described above. The only difference between the modified and preferred forms is that in the modification there is no provision for cushioning shock loads; in other words, the housing for the cylindrical ball-receiving member is also the tongue adapting member. In this case, the housing member 10a has a tail portion identical with the tail portion of housing member 10 of Figure 1 up to a point just to the rear of rivet 76. At this point the section is suitably enlarged, as at 92, to fit the contemplated tongue of the vehicle to be drawn. As before noted, the size and shape of said section will depend upon the size and shape of the vehicle tongue to be joined. In the present invention said tail portion is of inverted U section having the sides tapering toward the end. On top of said section are apertures 5a reinforced by bosses 6a in longitudinal alinement for the insertion of bolts or other suitable securing means.

At the point of section change is a lateral wall 94 which performs the same function as wall 7 of Figure 2 as regards reinforcing the section. In addition thereto it performs the function of anchor for spring 86 as does wall 26 of the preferred form.

It is really erroneous to state that either of the forms of this invention is preferred over the other, for either may be used with equal satisfaction—depending upon the requirements.

The form shown in Figures 4 and 5 is preferable for light-duty hauling and that shown in Figures 1, 2 and 3 is preferable for heavy-duty or passenger vehicle hauling.

It is evident from the above description that the device has advantages heretofore unobtainable in like devices. It is possible with this device to have the male member fixed to one vehicle and the female member fixed to a second vehicle and the two vehicles coupled together without the operator having to lift or otherwise move the male or female members to obtain engagement. All that is necessary is for the vehicles to be maneuvered so that the male member enters the opening in the female member, at which time the operator merely pulls a lever through 180 degrees and drops a locking pin in place. It is also evident that with the one operation of pulling the lever through 180 degrees the male member is locked positively in the female member.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a coupling device of ball and socket type, an elongate member terminating at one end in a cylindrical socket housing, the axis of said housing being transverse to the longitudinal axis of said member, said housing having a lateral opening forming a ball passage coaxial with said member, a cylindrical ball socket journalled for rotation in said housing, having a ball passage registrable with said opening in the housing, and actuating means for said socket.

2. A universal coupler comprising a ball-shaped male member, a female member consisting of a housing, a cylindrical member rotatably mounted in one end of said housing and lever operated, a ball-securing member rockably supported in said housing adjacent said end, said cylindrical member having a spherical surface therein and an opening opposite said spherical surface adapted to receive the free end of said ball-securing member for the purpose of locking said ball-shaped member in place.

3. In a coupling device of the described class, a cylindrical socket housing, a cylindrical ball socket journalled in said housing, said housing and socket having registrable ball passages, said socket having a ball-engaging portion adapted to obstruct said housing passage, and a pivotally mounted ball-engaging element, cooperable with said socket portion to position a coupler ball therebetween.

4. In a coupling device of the described class, a socket housing having a cylindrical chamber, a hollow cylindrical member journalled in said chamber for oscillation about the axis thereof, and an element shiftably carried by the housing, coacting with said member to form a ball socket, said housing and member having registrable ball passages.

5. In a coupling device of the described class, a tongue member, a cylindrical socket-housing integral with said member, means forming a ball-socket, including a pair of individually mounted, rotatable elements each of which has a ball-engaging surface area, said elements coacting with said member and housing to form a reservoir for lubricant.

6. In a coupling device of the character described, a housing having a ball-receiving passage, a ball socket member shiftable in said housing to partially close and to open said passage, a ball-engaging element shiftable in said housing, means for locking said socket member in closed position, and means carried by said member for positively holding said element in ball-engaging position when said member is in its locked position.

7. In a tractor-trailer coupling device, in combination, a housing having a chamber provided with substantially horizontal inlet passage, a ball member having a substantially vertical neck and a head larger than said neck but small enough to pass directly through said inlet passage into said chamber, and means shiftable within said housing to overlap a sufficient portion of said passage to prevent removal of said head, said housing having a cylindrical interior surface with its axis transverse to that of said passage, and said means comprising a member adapted to be positioned initially at the rear of said surface to form an abutment for the entering head and thereafter to be oscillated about the axis of the cylindrical surface into the space between said head and the forward side of said surface.

JOHN A. SCHROEDER.
CHARLES F. GLASER.